United States Patent

[11] 3,630,675

| [72] | Inventors | Charles Prasky<br>Minneapolis;<br>Warren M. Mahan, Grand Rapids, both of Minn. |
|------|-----------|---|
| [21] | Appl. No. | 798,150 |
| [22] | Filed | Feb. 10, 1969 |
| [45] | Patented | Dec. 28, 1971 |
| [73] | Assignee | The United States of America as represented by the Secretary of the Interior |

[54] SELECTIVE OXIDATION OF FERROUS SCRAP
10 Claims, No Drawings

[52] U.S. Cl. ..................................... 23/200, 75/44, 75/28
[51] Int. Cl. ..................................... C01g 49/08, B07b 13/00, C21b 1/02
[50] Field of Search ........................... 23/200; 75/28, 44

[56] References Cited
UNITED STATES PATENTS

| 1,453,057 | 4/1923 | Williams | 23/200 X |
| 1,751,550 | 3/1930 | Hyde | 23/200 X |
| 3,273,993 | 9/1966 | Melcher | 75/1 |

OTHER REFERENCES

" Solid Wastes Management, Refuse Removal Journal," Vol. 11, Page 11 (Feb. 1968)

*Primary Examiner*—M. Weissman
*Attorneys*—Ernest S. Cohen and William S. Brown

ABSTRACT: A method for utilizing ferrous scrap, particularly automobile scrap, comprising selectively oxidizing the scrap under conditions such that portions of the scrap having a thickness less than about one-eighth inch are substantially completely oxidized and portions having a thickness greater than about one-eighth inch are less than completely oxidized. The unoxidized portion of the scrap is then recovered as a dense residual scrap which may be used as a heavy melting stock for an electric furnace or foundry. The oxidized scrap, consisting of a high-grade iron oxide material, finds utility in processes such as production of powder iron by various sponge iron processes.

SELECTIVE OXIDATION OF FERROUS SCRAP

Large amounts of low-value ferrous scrap, such as automobile hulks, refrigerators, stoves, etc., contain combinations of light gauge metal and heavier structural members. Prior art methods of handling this type of scrap include selective scrapping, pressing into No. 2 bundles and shredding and magnetic separation. Efficient utilization of such scrap has, however, been difficult due to the lack of uniformity of the material.

It has now been found that efficient utilization of such ferrous scrap may be achieved by selective oxidation of the scrap under conditions whereby the light gauge portions of the scrap, i.e., portions having a thickness less than about one-eighth inch, are substantially completely oxidized and the heavier structural members, i.e., those having a thickness greater than about one-eighth inch, are substantially unoxidized or are only partially oxidized. The oxidized portions of the scrap yield a high-grade iron oxide which may be utilized, either alone or blended with lower grade or marginal iron ore products (such as pellets or sinter), to produce a product useful for production of iron.

The unoxidized portions of the scrap yield a high bulk density ferrous scrap (heavy melting stock) that is more valuable than the original scrap material and may be used, e.g., as feed for an electric furnace or foundry.

Oxidation of the ferrous scrap is conveniently accomplished by either of two processes, which constitute preferred embodiments of the invention. The first consists of roasting in any suitable high-temperature apparatus such as a rotary kiln. According to this embodiment of the invention the scrap, initially comminuted to a suitable particle size, is fed, preferably continuously, into a rotary kiln heated to a temperature of from about 650° to 1,000° C. Optimum particle size of the scrap will depend on the internal diameter of the kiln. A larger kiln will, of course, accommodate larger pieces of scrap. The temperature should not exceed the melting point of copper, i.e., 1,083° C., to minimize contamination of the final ferrous products by molten copper. The kiln is heated by a natural gas, solid fuel or oil burner and sufficient air for complete combustion of any inflammable materials. Secondary air may also be supplied to facilitate a more complete oxidation of the light gauge portions of the scrap. Amounts of secondary air will vary to provide sufficient oxygen for combustion of inflammable materials, such as rubber, wood, etc. in the case of automobile bodies. Removal of inflammable materials may also be accomplished prior to introduction into the kiln.

Products of combustion from the burner provide carbon dioxide and steam which react with the metallic iron in the scrap, oxidizing it stepwise to magnetite:

$$2Fe + CO_2 + H_2O \rightarrow 2FeO + CO + H_2 \quad (1)$$

$$6FeO + CO_2 + H_2O \rightarrow 2Fe_3O_4 + CO + H_2 \quad (2)$$

Products obtained from the kiln consist of a premium grade magnetic iron oxide and the unconsumed heavy gauge material, such as the heavier members of automobile bodies. These are readily separated by screening of the product.

The second process of roasting nonmagnetic iron ore with the ferrous scrap under conditions similar to those employed in the above-described oxidation. Carbon monoxide and hydrogen gases generated by reactions (1) and (2), above, in turn reduce the hematite in the ore to provide additional magnetite:

$$6Fe_2O_3 + CO + H_2O \rightarrow 4Fe_3O_4 + CO_2 + H_2 \quad (3)$$

Thus, metallic iron gains oxygen and the hematite loses oxygen with both sources of iron simultaneously yielding magnetite. Products, and their recovery, from this embodiment of the invention are essentially the same as the above-described embodiment. This embodiment, however, enables utilization of submarginal nonmagnetic ores. The broad concept and practice of utilization of such ores by reduction with metallic iron is disclosed in U.S. Pat. No. 3,273,993. In this embodiment steam may also be introduced into the reaction zone in order to (1) further expedite oxidation of the scrap, (2) temper the intensity of the burner flame and (3) provide a more uniform temperature profile in the kiln.

The proportion of unoxidized scrap, i.e., the dense residual scrap, may vary considerably depending on the nature and source of the original scrap, feed rate of the scrap to the kiln, reaction conditions such as temperature, presence or absence of air or steam, etc. Generally, however, the amount of unoxidized scrap will vary from about 30 to 50 percent by weight of the original scrap. Suitable feed rates of the scrap may also vary widely, depending upon the size of the furnace employed.

The following examples will serve to more particularly illustrate the process of the invention. The apparatus employed in the examples consisted of a rotary kiln 34 inches ID by 36 feet long and brick lined with a 4½-inch retaining dam at the burner (discharge) end. A trommel attached to this end contained adjustable openings for selective size separation of the roast products. Kiln slope was held constant at one-quarter inch per foot and speed of rotation was controlled by a varispeed drive with a range from 0.75 to 3.3 r.p.m. Stainless steel thermocouple wells projected into the kiln through the brick lining and temperatures were determined at five points along the length of the kiln. Chromel-Alumel couples were used with compensating lead wire extending from slip rings on the kiln to recording instruments in the control room. The thermocouple located nearest the burner was connected to a recording controller and desired temperatures were held automatically, preferably below the melting point of copper (1,083° C.). Heat to the kiln was provided by a premix natural gas burner and the mixture of gas and air was also controlled automatically to provide neutral combustion gases from the burner flame. Combustion gases were analyzed periodically by either a gas chromatograph or an Orsat apparatus. The lower end of the kiln contained a sliding seal to control the entry of secondary air. Kiln pressure was regulated by an exhaust fan in the stack and by the regulation of manually adjusted damper located in the ductwork between the feed end of the kiln and the exhaust fan. Pressures at the discharge housing and at the feed end were observed in the control room on inclined manometers.

A vibrating feeder projected a few inches into the kiln and provided forward motion to entering materials. A dry dust collector captured approximately 90 percent of the 10-20 micron dust from the kiln exhaust gas; a wet scrubber removed approximately 99 percent of the remaining dust larger than 2 microns. The dust from the dry collector was gathered in 55-gallon metal drums and the slime from the wet scrubber was settled in a 5-foot thickener. A dewatering classifier was used for water quenching and transporting the roasted iron oxide product from the kiln into hoppers. The pool of the classifier provided a water seal between the system and the surrounding atmosphere. A tumbling drum was employed to clean pieces of unconsumed metal scrap, and a magnetic separator removed nonmagnetics (Cu) from the scrap pieces. A pilot plant for magnetic separation and for flotation treatment of roast products was available in an adjacent building.

EXAMPLE 1

This example illustrates the first of the preferred embodiments discussed above.

The ferrous scrap employed in this example was unburned, sheared, automobile scrap in the form of loose bundles not exceeding 6 inches × 6 inches × 12 inches, and having a bulk density of 59 pounds per cubic foot. The scrap was processed in the above-described kiln at a temperature of 1,000° C., and a rate of 300 pounds per hour using secondary air to aid oxidation. The secondary air was introduced into the kiln through the discharge opening by means of a blower. Airflow rates were measured by means of a pitot tube.

Products were discharged from the kiln through 6-inch openings in a retaining trommel and quenched in water contained in the cooling drum. From the cooling drum the products were screened over a ½-inch trommel, to separate oxide scale from scrap. The scrap then was tumbled in the tumbling drum to remove adhering scale and separated on ¼-inch trommel. Scrap of a size less than 2 inches was removed on a 2-inch trommel passed over a magnetic belt separator to remove nonmagnetic material most of which consisted of copper. Heavy melting scrap such as casting, bars, rods and nuts and bolts were removed from both the minus 2-inch and plus 2-inch fractions of scrap before the remaining lighter gauge was recycled into the kiln.

A total of 67,273 pounds of scrap was processed in 10 days of operation and 72.3 percent maximum oxidation of the iron fraction of the auto scrap was attained using 19,170 s.c.f.h. of secondary air. With only 8,620 s.c.f.h. of secondary air the iron oxidation was 67.0 percent. About 20 percent of the original scrap was unconsumed and recovered as a clean ferrous scrap having a bulk density of over 100 pounds per cubic foot.

EXAMPLE 2

This example illustrates the second of the preferred embodiments. The ferrous scrap was prepared as follows: About 70 automobile hulks were sheared in an unburned condition into nominally sized pieces 6 inches × 6inches × 12 inches. Stripping of the cars prior to shearing had been limited to removal of the engine, transmission, radiator, and battery. On an average, one fender, part of a hood, and two wheels were missing from each car. Approximately one-half of the drive shafts and differentials and a few grills were also missing. The unburned scrap contained 7.9 percent combustible matter.

The iron ore employed consisted chiefly of goethite with small quantities of hematite, magnetite, pyrites and manganese oxide. It was crushed to minus one-fourth inch before roasting.

Nominal feed rates of 1,000 pounds of ore and 140 pounds of scrap per hour were maintained throughout the test. This provided approximately 1 unit of iron in the form of the thinner, more reactive, pieces of scrap for each 6 units of iron in the ore and was somewhat in excess of theoretical metallic iron requirements. Ore and scrap were fed by vibrating conveyors into the kiln which were heated to a maximum temperature of 1,000° C. at the discharge end. The combination of air and natural gas for the burner was controlled to provide a neutral atmosphere. The combustion products, $CO_2$ and $H_2O$, traveled countercurrent to the flow of the charge and provided the reaction gases necessary for the oxidation of the metal scrap and, in turn, the reduction of the ore to magnetite. Additional steam was added to the kiln at a rate of 34 gallons of water an hour to temper the intensity of the burner flame and to provide a longer and more uniform temperature zone. The roast product was discharged from the kiln through ¾-inch openings in a trommel which was attached directly to the end of the kiln. The hot ore product was water quenched and stockpiled for subsequent processing in a magnetic separation system. A magnetic tube test on the composited roast product demonstrated production of an iron oxide concentrate containing 66.1 percent iron and 5.7 percent silica with an iron recovery of 96.8 percent. Oversized pieces of unconsumed scrap were discharged separately over the end of the trommel, water quenched, and tumbled in a rotating drum to remove adherent oxide scale. The partially oxidized scale, one-quarter inch) consisting largely of wustite, was returned to the kiln to complete the oxidation to magnetite and, for the purpose of this test, the oxide-free scrap was sorted to separate the thin gauge pieces from the thick.

What is claimed is:

1. A method for utilizing ferrous scrap containing substantial portions having a thickness of less than about one-eighth inch and substantial portions having a thickness of greater than about one-eighth inch comprising selectively oxidizing the scrap under conditions whereby those portions of the scrap having a thickness of less than about one-eighth inch are substantially completely oxidized to magnetic iron oxide and those portions of the scrap having a thickness greater than about one-eighth inch are subjected only to surface oxidation, and screening to separate the resulting magnetic iron oxide from the surface-oxidized portion of the scrap.

2. The method of claim 1 in which the ferrous scrap is automobile scrap.

3. The method of claim 1 in which the oxidation is accomplished by roasting at a temperature not exceeding the melting point of the ferrous iron component.

4. The method of claim 3 in which the temperature of the roasting is about 1,000° C.

5. The method of claim 3 in which the roasting is carried out in the presence of added air.

6. The method of claim 3 in which the roasting is carried out in a rotary kiln.

7. The method of claim 1 in which the oxidation is accomplished by roasting at a temperature of about 650° to 1,000° C. in the presence of nonmagnetic iron ore.

8. The method of claim 7 in which the temperature of the roasting is about 1,000° C.

9. The method of claim 7 in which the roasting is carried out in the presence of steam.

10. The method of claim 7 in which the roasting is carried out in a rotary kiln.

11. The method of claim 1 in which the ferrous scrap contains an amount of portion having a thickness greater than about one-eighth inch sufficient to yield a product containing about 20 to 50 percent by weight of unoxidized material.

* * * * *